United States Patent [19]
Mori

[11] Patent Number: 6,147,775
[45] Date of Patent: *Nov. 14, 2000

[54] FACSIMILE CONTROL SYSTEM

[75] Inventor: Hiromi Mori, Nagoya, Japan

[73] Assignee: Brother Kogyo Kabushiki Kaisha, Nagoya, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/855,111

[22] Filed: May 13, 1997

Related U.S. Application Data

[63] Continuation-in-part of application No. 08/616,307, Mar. 15, 1996, Pat. No. 5,798,848.

[30] Foreign Application Priority Data

May 13, 1996  [JP]  Japan .................................... 8-117496

[51] Int. Cl.⁷ ............................................. H04N 1/32
[52] U.S. Cl. ............................................. 358/468
[58] Field of Search .................. 358/442, 468, 358/434, 407

[56] References Cited

U.S. PATENT DOCUMENTS

| | | | |
|---|---|---|---|
| 5,200,830 | 4/1993 | Imaizumi et al. | 358/442 |
| 5,257,117 | 10/1993 | Kang et al. | 358/468 |
| 5,499,108 | 3/1996 | Cotte et al. | 358/400 |
| 5,530,554 | 6/1996 | Maehara | 358/442 |
| 5,644,404 | 7/1997 | Hashimoto et al. | 358/434 |
| 5,684,607 | 11/1997 | Matsumoto | 358/442 |
| 5,798,848 | 8/1998 | Ouchi | 358/468 |
| 5,909,289 | 1/1999 | Shibata et al. | 358/468 |
| 6,009,244 | 12/1999 | Kubota | 358/468 |
| 6,031,637 | 2/2000 | Shibata et al. | 358/468 |

*Primary Examiner*—Yon J. Couso
*Attorney, Agent, or Firm*—Oliff & Berridge, PLC

[57] ABSTRACT

A facsimile control system includes a facsimile device connected to a host device. The host device has an operation instructing mechanism for instructing an operation of the facsimile device. The host device also has a sending/receiving mechanism for sending or receiving data to or from the facsimile device based upon an instruction outputted from the operation instructing mechanism. The operation instructing mechanism activates the sending/receiving mechanism before instructing the operation of the facsimile device.

22 Claims, 4 Drawing Sheets

FACSIMILE CONTROL SYSTEM

This application is a continuation-in-part of U.S. patent application Ser. No. 08/616,307, which issued as U.S. Pat. No. 5,798,848 filed Mar. 15, 1996, issue date on Aug. 25, 1998.

BACKGROUND OF THE INVENTION

1. Field of Invention

The invention relates to a facsimile control system which ensures the operation of a facsimile device without requiring a troublesome operation.

2. Description of Related Art

Recently, a system has been developed wherein a facsimile device is connected to a host device, such as a personal computer. This system enables data to be sent to, or received from, another facsimile device by the personal computer. This system also enables the facsimile device connected to the personal computer to be utilized as a printer or a scanner of the personal computer. This system has the advantage of providing a facsimile, scanner and printer function by only connecting the facsimile device to the personal computer. A control program provided to the personal computer controls the facsimile device.

FIG. 4 is a schematic showing the components of the system. A personal computer 1 has three input/output ports, namely a first port 2A, a second port 2B and a third port 2C of RS-232C standard. The personal computer 1 is connected to a facsimile device 7 via one of these input/output ports. The personal computer mainly includes an application program 6, a driver program 5 and a monitor program 3 and executes them. The personal computer 1 also includes a hard disc 4. The application program 6, which is operated directly by a user, is provided with a viewer program 6A for displaying the contents of data on a screen. The application program 6 also includes a log manager program 6B for controlling a storage operation of a communication history between the personal computer and the facsimile device 7 connected to the personal computer 1.

The driver program 5 is between the application program 6 and the facsimile device 7 so as to facilitate the sending and receiving of data therebetween. A method of accessing the facsimile device 7, which is connected to the personal computer 1, varies depending upon the hardware of the facsimile device 7 or the personal computer 1. However, it is difficult to change the access method of the application program 6 for every different environment. Therefore, the driver program 5 is between the application program 6 and the facsimile device 7, so that the access method of the application program 6 does not have to be changed. The driver program 5 deals with the access method which is different for the environment.

There are three kinds of driver programs 5 which are between the application program and the facsimile device 7, including a scanner driver 5A, a FAX driver 5B and a printer driver 5C. The scanner driver 5A is a driver program when the facsimile device 7 is used as a scanner device. The FAX driver 5B is a driver program used either for sending the data stored in the personal computer 1 from the facsimile device 7 to another facsimile device via a telephone line, or for receiving by the personal computer 1 the data received from another facsimile device via the telephone line. The printer driver 5C is a driver program when the facsimile device 7 is used as a printer.

The monitor program 3, which is between the input/output ports 2A–2C and the driver program 5, monitors the input/output ports 2A–2C to which the facsimile device 7 is connected. The monitor program also performs a format conversion of the data which is sent to, or received from, the facsimile device 7.

The operation of each program in this system is explained below. In the case of executing the application program 6 which accesses to the facsimile device 7, a user initially activates the monitor program 3. The user further sets the input/output ports to which the facsimile device 7 is connected, and a communication speed to the facsimile device 7. After activating the monitor program 3, the user activates the application program 6 which he or she wishes to execute. Subsequently, the user operates the application program 6 to access the facsimile device 7. The access to the facsimile device 7 is transmitted to the facsimile device 7 via the driver program 5, monitor program 3 and input/output ports. However, a reply from the facsimile device 7 is returned to the application program 6 via the input/output ports, monitor program 3 and driver program 5. In the access to the facsimile device 7, the data which is sent to, or received from, the facsimile device 7 is stored in the hard disc 4, as the need arises.

The monitor program 3 is accessed from each of the driver programs 5A–5C as described above. Therefore, the monitor program 3 must be activated upon activating each of the driver programs 5A–5C.

However, the user may forget to activate the monitor program 3 before the execution of the application program 6. When the monitor program 3 has not been activated, the driver program 5, which is accessed by the application program 6, cannot access the monitor program 3. Therefore, the access from the application program 6 cannot be sent to the facsimile device 7, which prevents the operation of the facsimile device 7.

In the situation where the user forgets to activate the monitor program 3 as described above, the application program 6 is informed by the driver program 5 that the monitor program 3 has not been activated. After being notified, the application program 6 displays a message onto a screen to urge the user to activate the monitor program 3. The user recognizes the display and activates the monitor program 3. Subsequently, the user must again attempt to execute the application program 6, thereby entailing a problem of requiring a troublesome operation.

SUMMARY OF THE INVENTION

The invention solves the aforesaid problem, and provides a facsimile control system which ensures the operation of a facsimile device without requiring a troublesome operation.

A facsimile control system in accordance with a first embodiment of the invention includes a host device. A facsimile device is connected to the host device. The host device is provided with an operation instructing mechanism for instructing an operation to the facsimile device. The host device is also provided with a sending/receiving mechanism for sending or receiving data to or from the facsimile device based upon the instruction outputted from the operation instruction mechanism. The operation instructing mechanism activates the sending/receiving mechanism before instructing the operation to the facsimile device.

In accordance with the first embodiment of the facsimile control system, the sending/receiving mechanism is activated before the instruction of the operation is performed to the facsimile device by the operation instructing mechanism. When the operation is instructed to the facsimile device by the operation instructing mechanism after activating the sending/receiving mechanism, the instruction is inputted to the sending/receiving mechanism to be transmitted to the facsimile device via the sending/receiving mechanism, which enables the operation of the facsimile device.

A facsimile control system in accordance with a second aspect of the invention has a host device which includes a judging mechanism for judging whether the sending/receiving mechanism is activated. The host device also includes multiple operation instructing mechanisms which activate the sending/receiving mechanism when the sending/receiving mechanism is judged by the judging mechanism to be deactivated.

The second embodiment of the facsimile control system operates in the same manner as the facsimile control system of the first embodiment. However, the second embodiment of the facsimile control system uses the judging mechanism to judge whether the sending/receiving mechanism is activated before the operation is instructed to the facsimile device by the operation instructing mechanism. If the sending/receiving mechanism has not been activated as a result of the judgment, the sending/receiving mechanism is activated by the operation instructing mechanism.

A facsimile control system in accordance with a third aspect of the invention has a host device that includes a connecting port detecting mechanism for detecting a port to which the facsimile device is connected. The host device also includes a communication speed setting mechanism for setting a communication speed to the facsimile device. The connecting port detecting mechanism and the communication speed setting mechanism are executed when the sending/receiving mechanism is activated.

The third embodiment of facsimile control system operates in the same manner as the facsimile control system of the first and second embodiments. However, in the third embodiment of the facsimile control system, the connecting port of the facsimile device and the communication speed to the facsimile device are detected to be set when the sending/receiving mechanism is activated, i.e., before the operation is instructed to the facsimile device by the operation instructing means.

In accordance with the first embodiment of the facsimile control system, the sending/receiving mechanism is activated before the operation is instructed to the facsimile device by the operation instructing mechanism, which ensures the operation of the facsimile device without requiring a troublesome operation.

In accordance with the second embodiment of the facsimile control system, in addition to the advantages provided by the first embodiment of the facsimile control system, the sending/receiving mechanism is activated by the operation instructing mechanism when the judging mechanism judges that the sending/receiving mechanism has not been activated which prevents the sending/receiving mechanism from being activated repeatedly. Preventing the sending/receiving mechanism from being activated repeatedly speeds up the control. Further, the sending/receiving mechanism is not repeatedly loaded into the memory, thereby effectively utilizing the memory.

In accordance with the third embodiment of the facsimile control system, in addition to the advantages provided by the first and second embodiments of the facsimile control system, the user does not have to set the connection port to the facsimile device and the communication, which enables the operation of the facsimile device without requiring a troublesome operation.

DETAILED DESCRIPTION OF A PREFERRED EMBODIMENT

Figure 1:
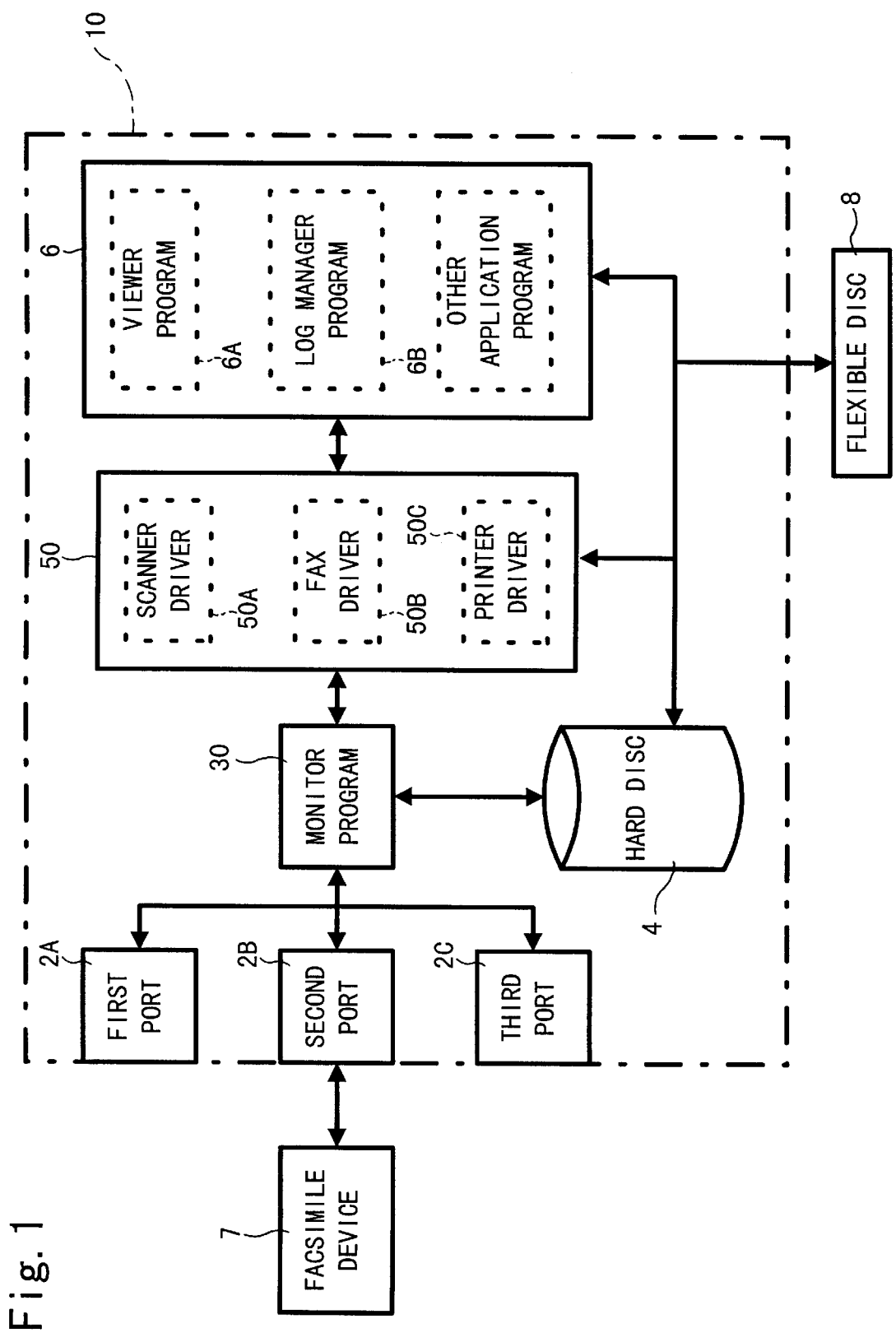
FIG. 1 is a schematic of a facsimile control system in accordance with an embodiment of the invention.

A preferred embodiment of the invention is explained with reference to FIGS. 1–3. An embodiment of the facsimile control system includes a facsimile device 7 which is connected to a personal computer 10 serving as a host device. This system is similar to the conventional system schematically shown in FIG. 4, such that the same elements are designated by the same reference numbers and duplicative explanations are omitted. The driver program 50 of this embodiment includes a scanner driver 50A, a FAX driver 50B and a printer driver 50C, as well as a monitor program 30.

Figure 2:
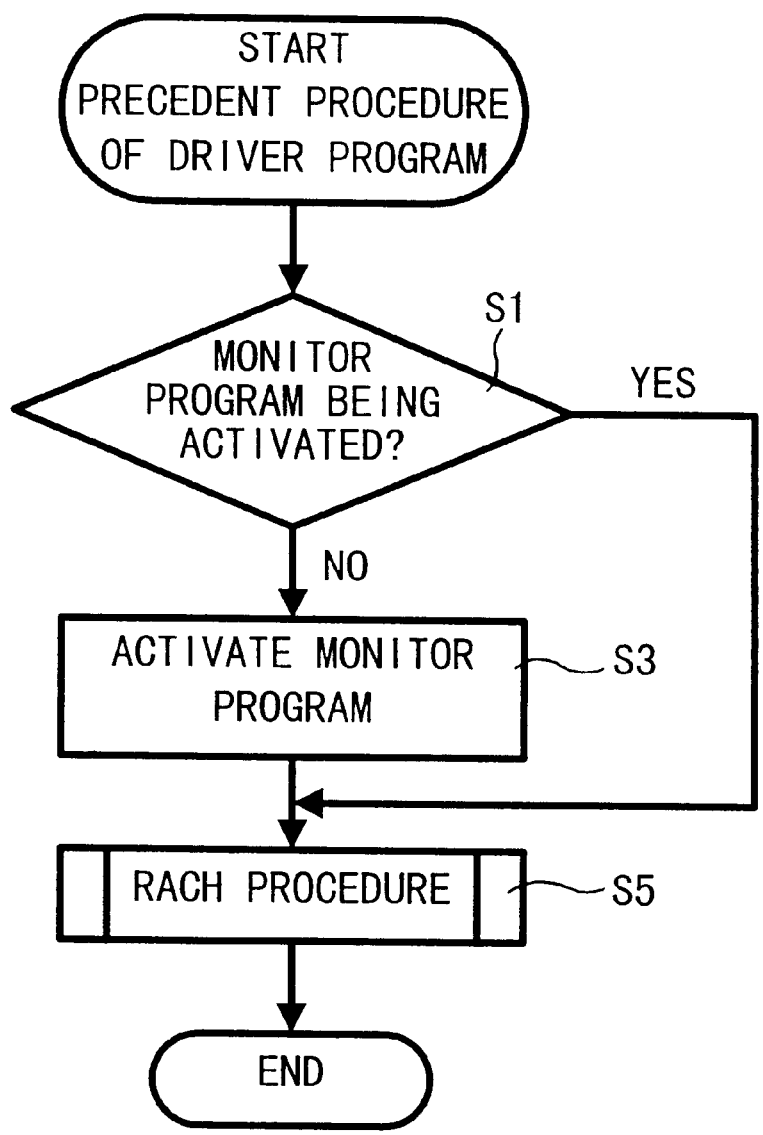
FIG. 2 is a flow chart showing a precedent procedure of each driver program.

FIG. 2 is a flow chart showing a precedent procedure of each driver program 50A–50C. When an operation is instructed to the facsimile device 7 from an application program 6, such as a viewer program 6A, each of the driver programs 50A–50C which correspond to the instructed operation is executed. For example, when a reading-out operation is instructed to use the scanner of the facsimile device 7, the scanner driver 50A is executed. If facsimile-sending data is stored in a hard disc 4, the FAX driver 50B is executed. If the data stored in the hard disc 4 is printed by using the facsimile device 7, the printer driver 50C is executed.

In the precedent procedure of each driver program 50A–50C, the issue of whether the monitor program 30 is being activated or not (S1) is checked first. If the monitor program 30 is not activated (S1:No), the monitor program 30 is activated (S3). After the monitor program 30 (S3) is activated, or in case where the monitor program 30 is activated (S1:Yes), a procedure corresponding to each driver program 50A–50C is performed subsequently, for example, an instruction of the operation to the monitor program 30 (S5).

Figure 3:
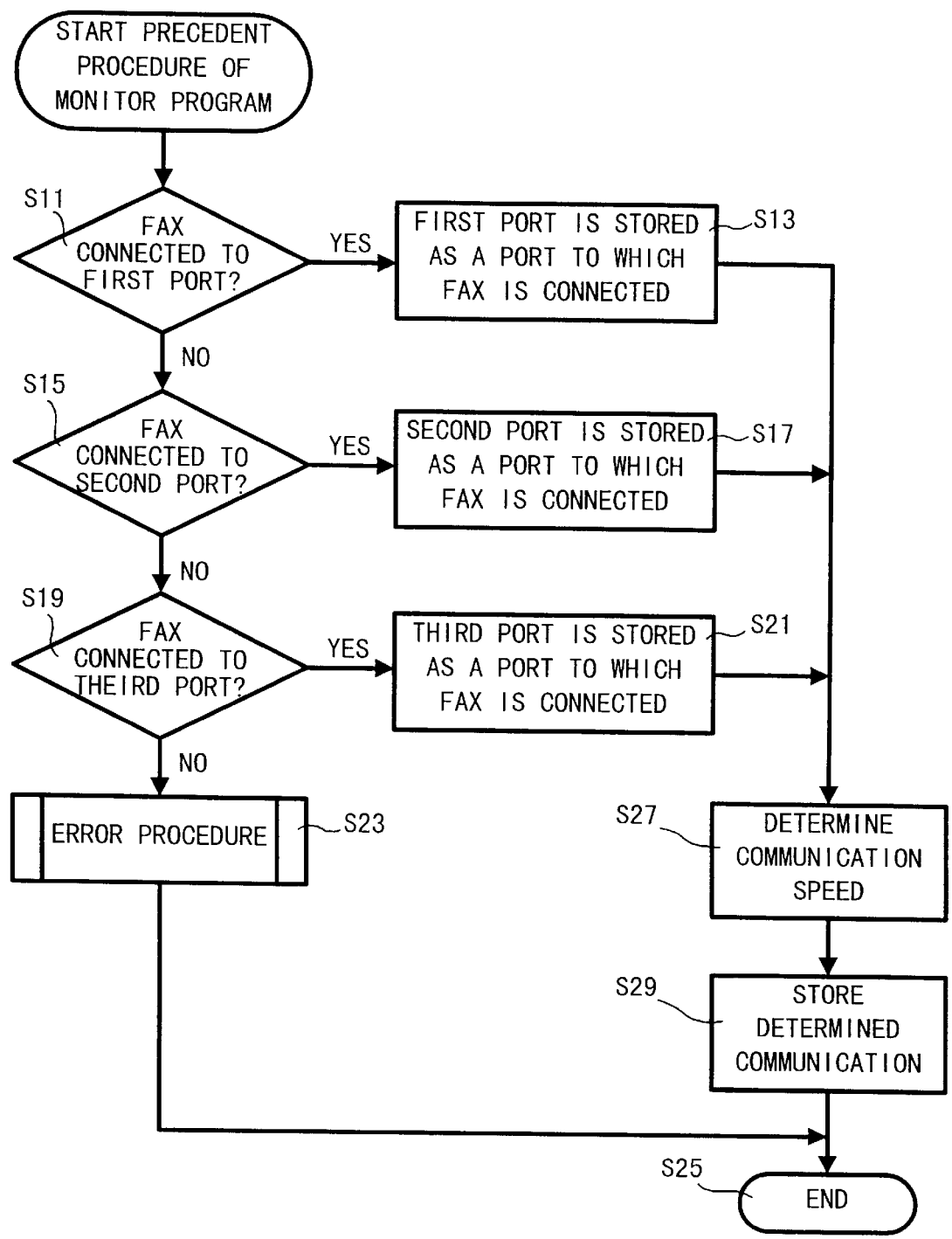
FIG. 3 is a flow chart showing a precedent procedure of a monitor program.
Figure 4:
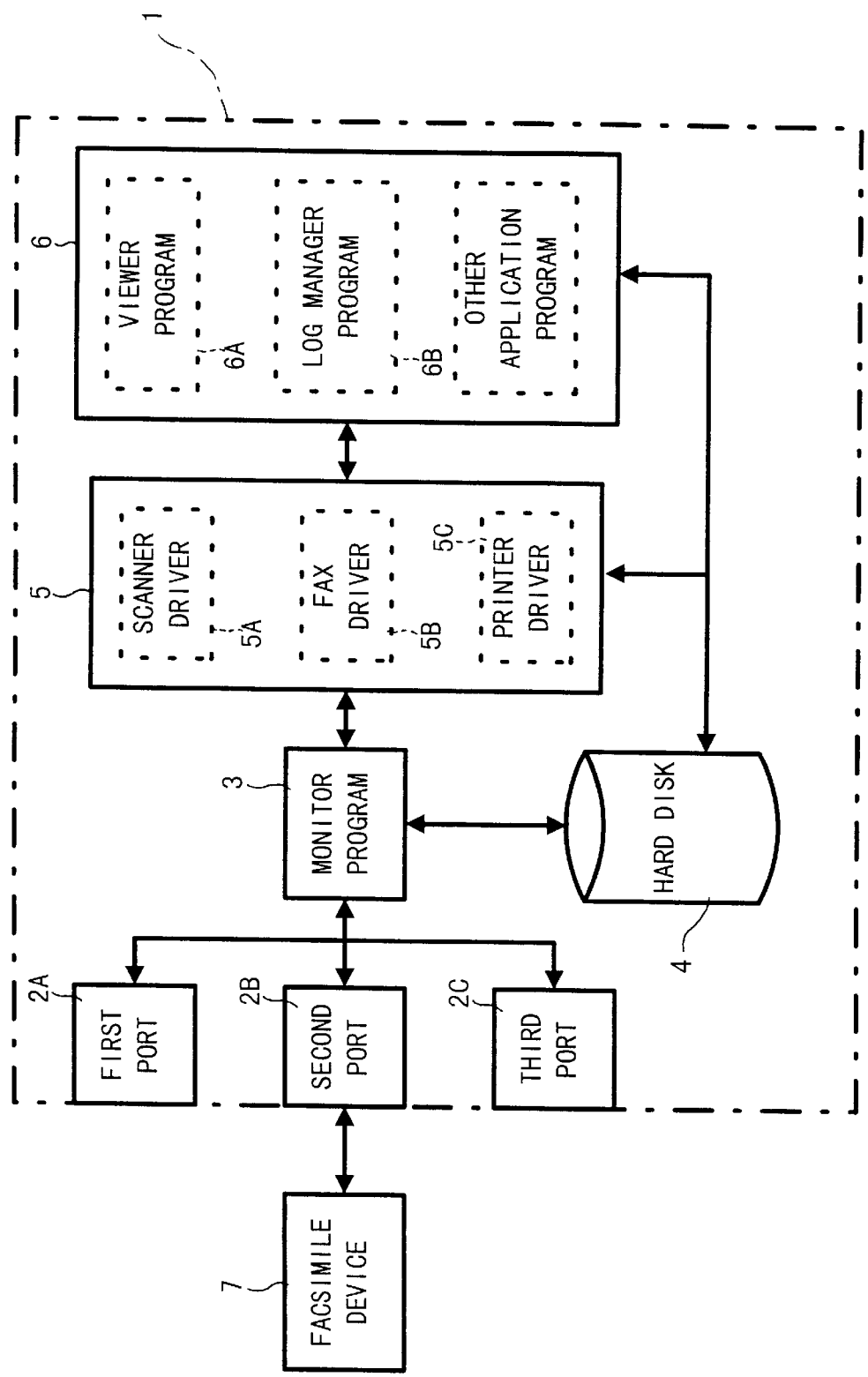
FIG. 4 is a schematic showing a conventional facsimile control system.

When the monitor program 30 is activated by the procedure of S3 shown in FIG. 2, a procedure of the monitor program 30 is executed as shown in the flowchart of FIG. 3. The precedent procedure of the driver programs 50A–50C shown in FIG. 2, and the precedent procedure of the monitor program 30 shown in FIG. 3, are simultaneously executed.

In the precedent procedure of the monitor program 30 shown in FIG. 3, the monitor program 30 detects which input/output ports are connected to the facsimile device (S11 to S21). This detection is performed such that a first port 2A to a third port 2C are successively used to send a predetermined signal to the facsimile device, and then to receive a reply signal sent from the facsimile device 7 based upon the signal. Namely, when the reply signal is not received even though the predetermined signal was sent, or when the received reply signal is wrong, it can be judged that the facsimile device 7 is not connected to the input/output port. However, when a correct reply signal is received after sending the predetermined signal, it can be judged that the facsimile device 7 is connected to the input/output port which sends or receives the signal.

This procedure is performed with respect to the first port 2A (S11). If the facsimile device 7 is connected to the first port 2A (S11:Yes) as a result of the detection, the first port 2A is stored in the hard disc 4 as a port to which the facsimile device 7 is connected (S13). If the facsimile device 7 is not connected to the first port 2A (S11:No), the second port 2B is subsequently checked (S15). If the facsimile device 7 is connected to the second port 2B (S15:Yes), the second port 2B is stored in the hard disc 4 as a port to which the facsimile device 7 is connected (S17). If the facsimile device 7 is not connected to the second port 2B (S15:No), the third port 2C is further checked (S19). If the facsimile device 7 is connected to the third port 2C (S19:Yes), the third port 2C is stored in the hard disc 4 as a port to which the facsimile device 7 is connected (S21).

When the facsimile device 7 is not connected to the third port 2C (S19:No), it means that the facsimile device 7 is not connected to any of the input/output ports. Thus, an error procedure is performed (S23) to terminate this procedure (S25). This error procedure (S23) informs the application program 6 which activated the driver program 50, via the driver program 50 which activated the monitor program 30, that the facsimile device 7 is not connected.

When the connecting port of the facsimile device 7 is detected and stored (S13, S17, S21), a determination procedure is performed for a communication speed between the facsimile device 7 and the monitor program 30 via the detected connecting port (S27). The determination procedure of the communication speed is performed as described below.

Initially, the monitor program 30 (personal computer 10) inquires as to the communication speed of the facsimile device 7. Upon receiving this inquiry, the facsimile device 7 informs the personal computer 10 (monitor program 30) of its communication speeds. For example, if the facsimile device 7 has four types of communication speeds; 4800 BPS, 9600 BPS, 19200 BPS and 38400 BPS, all four types of communication speeds are provided to the personal computer 10 (monitor program 30). The monitor program 30 determines an optimum communication speed among the given communication speeds by choosing the fastest common communication speed which is available for both the personal computer 10 and the facsimile device 7. The facsimile device 7 is then informed of the optimum communication speed. When confirming the determined communication speed, the facsimile device 7 sends to the personal computer 10 (monitor program 30) the reply signal which shows the agreement of the communication speed, to thereby terminate the procedure for determining the communication speed.

When the communication speed is determined, the monitor program 30 causes the hard disc 4 to store the determined communication speed (S29) to terminate the precedent procedure (S11 to S29). Thereafter, the monitor program 30 executes each procedure according to the instruction of the driver program 50. When a close procedure of the monitor program 30 is instructed in each procedure, the monitor program 30 terminates the procedure.

As described above, in accordance with the facsimile control system of the embodiment, each driver program 50A–50C activates the monitor program 30 before the operation is instructed to the monitor program 30, which ensures the operation of the facsimile device without the user activating the monitor program 30 individually. The activation of the monitor program 30 by each driver program 50A–50C is executed only when the monitor program 30 is found to be deactivated after it is confirmed whether the monitor program 30 has been activated. This procedure prevents the monitor program 30 from being repeatedly activated. Accordingly, it is possible to avoid the adverse effects caused by the repeated activation of the monitor program 30, such as a delay in the procedure or repeated use of memory.

A flexible disc 8 which stores the programs for executing each of the processes described above can be set into a flexible disc drive (not shown) to install the programs into the personal computer 10.

What is claimed is:

1. A facsimile control system, comprising:

a facsimile device; and a host device connected to the facsimile device, the host device having operation instructing means for instructing an operation of the facsimile device, and sending/receiving means for sending or receiving data to or from the facsimile device based upon an instruction outputted from the operation instructing means, the operation instructing means activating the sending/receiving means before instructing the operation of the facsimile device.

2. The facsimile control system according to claim 1, wherein the host device includes determining means for determining whether the sending/receiving means is activated, and the operation instructing means activates the sending/receiving means when the sending/receiving means is determined by the determining means to be deactivated.

3. The facsimile control system according to claim 1, wherein the operation instructing means includes application means for instructing the facsimile device to operate as a facsimile and at least one of a scanner and a printer.

4. The facsimile control system according to claim 3, wherein the operation instructing means includes driver means for facilitating sending and receiving facsimile data and at least one of scanner data and printer data between the operation instructing means and the sending/receiving means.

5. The facsimile control system according to claim 4, wherein the sending/receiving means includes monitor means for controlling sending/receiving data between the sending/receiving means and the facsimile device.

6. The facsimile control system according to claim 5, wherein the host device includes connecting port detecting means for detecting a port to which the facsimile device is connected, and communication speed setting means for setting a communication speed of the facsimile device, the connecting port detecting means and the communication speed setting means being executed when the sending/receiving means is activated.

7. A facsimile control system, comprising:

a facsimile device; and a host device connected to the facsimile device, the host device having an operation instructing unit, the operation instructing unit instructs an operation of the facsimile device, the host device also having a sending/receiving unit, the sending/receiving unit sends or receives data to or from the facsimile device based upon an instruction outputted from the operation instructing unit, the operation instructing unit activating the sending/receiving unit before instructing the operation of the facsimile device.

8. The facsimile control system according to claim 7, wherein the host device includes a determining unit, the determining unit determines whether the sending/receiving unit is activated, and the operation instructing unit activates the sending/receiving unit when the sending/receiving unit is determined by the determining unit to be deactivated.

9. The facsimile control system according to claim 7, wherein the operation instructing unit includes an application controller, the application controller instructs the facsimile device to operate as a facsimile and at least one of a scanner and a printer.

10. The facsimile control system according to claim 9, wherein the operation instructing unit includes a driver, the driver facilitates sending and receiving facsimile data and at least one of scanner data and printer data between the operation instructing unit and the sending/receiving unit.

11. The facsimile control system according to claim 10, wherein the sending/receiving unit includes a monitor, the monitor controls the sending/receiving of data between the sending/receiving unit and the facsimile device.

12. The facsimile control system according to claim 11, wherein the host device includes a connecting port detector, the connecting port detector detects a port to which the facsimile device is connected, the host device also includes a communication speed setter, the communication speed setter sets a communication speed of the facsimile device, the connecting port detector and the communication speed setter are executed when the sending/receiving unit is activated.

13. A method of controlling a facsimile device by a host device, the host device control comprising the steps of:

instructing an operation of the facsimile device with a operation instructing unit;

sending or receiving data to or from the facsimile device based upon instruction outputted from the operation instructing unit with a sending/receiving unit;

activating the sending/receiving unit before instructing the operation of the facsimile device with the operation instructing unit.

14. The method according to claim 13, further including the step of instructing the facsimile device to operate as a facsimile and at least one of a scanner and a printer with an application controller.

15. The method according to claim 14, further including the steps of facilitating sending and receiving facsimile data and at least one of scanner data and printer data between the operation instructing unit and the sending/receiving unit with a driver, and controlling the sending/receiving of data between the sending/receiving unit and the facsimile device with a monitor.

16. The method according to claim 15, further including the steps of detecting a port to which the facsimile device is connected with a connecting port detector, setting a communication speed of the facsimile device with a communication speed setter, and executing the connecting port detector and the communication speed setter when the sending/receiving unit is activated.

17. A storage medium for use with a facsimile device, the storage medium comprising:

an operation instructing program that instructs an operation of the facsimile device; and a sending/receiving program that sends or receives data to or from the facsimile device based upon instruction outputted from the operation instructing program;

wherein the operation instructing program activates the sending/receiving program before instructing the operation of the facsimile device.

18. The storage medium according to claim 17, further including an application program, the application program instructing the facsimile device to operate as a facsimile and at least one of a scanner and a printer.

19. The storage medium according to claim 18, further including a driver program, the driver program sending and receiving facsimile data and at least one of scanner data and printer data between the operation instructing program and the sending/receiving program, and a monitor program, the monitor program controlling the sending and receiving of data between the sending/receiving program and the facsimile device.

20. The storage medium according to claim 19, further including a connecting port program, the connecting port program detecting a port to which the facsimile device is connected, and a communication speed setting program, the communication speed setting program setting a communication speed of the facsimile device, wherein the connecting port program and the communication speed setting program are executed when the sending/receiving program is activated.

21. A facsimile control system including a facsimile device and a host device connected to the facsimile device, the host device comprising:

operation instructing means for instructing an operation of the facsimile device;

sending/receiving means for sending or receiving data to or from the facsimile device based upon an instruction outputted from the operation instructing means; and determining means for determining whether the sending/receiving means is activated;

wherein the operation instructing means activates the sending/receiving means before instructing the operation of the facsimile device when the sending/receiving means is determined by the determining means to be deactivated.

22. The facsimile control system according to claim 21, wherein the operation instructing means directly instructs the operation of the facsimile device when the sending/receiving means is determined by the determining means to be activated.

* * * * *